(12) United States Patent
Barkai et al.

(10) Patent No.: US 7,337,209 B1
(45) Date of Patent: Feb. 26, 2008

(54) LARGE-SCALE NETWORK MANAGEMENT USING DISTRIBUTED AUTONOMOUS AGENTS

(75) Inventors: Sharon Barkai, Shoham (IL); Ariel Noy, Herzliya (IL); Yoel Shkolnisky, Or-Yehuda (IL)

(73) Assignee: Sheer Networks, Inc., Sunnyvale, CA (US)

( * ) Notice: Subject to any disclaimer, the term of this patent is extended or adjusted under 35 U.S.C. 154(b) by 450 days.

(21) Appl. No.: 09/698,272

(22) Filed: Oct. 30, 2000

Related U.S. Application Data (60) Provisional application No. 60/222,729, filed on Aug. 3, 2000, provisional application No. 60/200,507, filed on Apr. 28, 2000.

(51) Int. Cl.
*G06F 15/16* (2006.01)
(52) U.S. Cl. .................................................. 709/202
(58) Field of Classification Search ................ 709/202, 709/204, 205, 206, 223, 224, 225
See application file for complete search history.

(56) References Cited

U.S. PATENT DOCUMENTS

| | | | |
|---|---|---|---|
| 5,317,568 A | 5/1994 | Bixby et al. | |
| 5,504,921 A * | 4/1996 | Dev et al. | 709/223 |
| 5,583,861 A | 12/1996 | Holden | |
| 5,608,720 A | 3/1997 | Carter et al. | |
| 5,740,368 A * | 4/1998 | Villalpando | 709/202 |
| 5,758,083 A | 5/1998 | Singh et al. | |
| 5,777,549 A | 7/1998 | Arrowsmith et al. | |
| 5,781,537 A | 7/1998 | Ramaswami et al. | |
| 5,812,750 A * | 9/1998 | Dev et al. | 714/4 |
| 5,832,224 A | 11/1998 | Fehskens et al. | |
| 5,907,696 A | 5/1999 | Stilwell et al. | |
| 5,928,325 A | 7/1999 | Shaughnessy et al. | |
| 5,933,601 A * | 8/1999 | Fanshier et al. | 709/223 |
| 5,935,249 A * | 8/1999 | Stern et al. | 726/21 |
| 5,961,594 A | 10/1999 | Bouvier et al. | |
| 5,978,845 A | 11/1999 | Reisacher | |
| 5,999,179 A | 12/1999 | Kekic et al. | |
| 6,018,516 A | 1/2000 | Packer | |
| 6,032,183 A | 2/2000 | Chen et al. | |
| 6,035,331 A | 3/2000 | Soga et al. | |
| 6,047,320 A | 4/2000 | Tezuka et al. | |

(Continued)

FOREIGN PATENT DOCUMENTS

EP 0772319 5/1997

(Continued)

*Primary Examiner*—Jason Cardone
*Assistant Examiner*—Thomas Duong
(74) *Attorney, Agent, or Firm*—Hickman Palermo Truong & Becker LLP (57) ABSTRACT

In a computer network including a plurality of network elements, a network management architecture including a plurality of agents, each of the agents corresponding to a different one of the network elements, and a plurality of device components, each of the device components modeling at least one aspect of one of the network elements, the aspect being either of a physical and a functional characteristic of the network element, where each of the agents includes a plurality of the device components, and where at least of the two device components within at least one of the agents are logically interconnected, each logical interconnection corresponding to either of a physical and a functional interconnection found within or between any of the network elements.

29 Claims, 3 Drawing Sheets

U.S. PATENT DOCUMENTS

| | | | |
|---|---|---|---|
| 6,052,722 A | 4/2000 | Taghadoss | |
| 6,058,426 A | 5/2000 | Godwin et al. | |
| 6,073,162 A | 6/2000 | Johannsen et al. | |
| 6,085,240 A * | 7/2000 | Suzuki et al. | 709/223 |
| 6,101,541 A | 8/2000 | Ellesson et al. | |
| 6,105,061 A | 8/2000 | Nakai | |
| 6,115,736 A * | 9/2000 | Devarakonda et al. | 709/202 |
| 6,192,034 B1 | 2/2001 | Hsieh et al. | |
| 6,225,999 B1 * | 5/2001 | Jain et al. | 715/734 |
| 6,237,034 B1 | 5/2001 | Fulford | |
| 6,247,052 B1 | 6/2001 | Huang et al. | |
| 6,247,056 B1 | 6/2001 | Chou et al. | |
| 6,330,601 B1 * | 12/2001 | French et al. | 709/223 |
| 6,374,293 B1 * | 4/2002 | Dev et al. | 709/220 |
| 6,393,472 B1 * | 5/2002 | Anerousis et al. | 709/223 |
| 6,430,615 B1 * | 8/2002 | Hellerstein et al. | 709/224 |
| 6,487,590 B1 | 11/2002 | Foley et al. | |
| 6,557,122 B1 * | 4/2003 | Sugauchi et al. | 714/57 |
| 6,721,713 B1 * | 4/2004 | Guheen et al. | 705/1 |
| 6,826,632 B1 * | 11/2004 | Wugofski | 710/8 |
| 6,839,747 B1 * | 1/2005 | Blumenau et al. | 709/223 |

FOREIGN PATENT DOCUMENTS

| | | |
|---|---|---|
| EP | 0838919 | 4/1998 |
| EP | 0899912 | 3/1999 |
| EP | 0963076 | 12/1999 |
| JP | 11 122260 | 4/1999 |
| WO | WO 99/57649 | 11/1999 |

* cited by examiner

LARGE-SCALE NETWORK MANAGEMENT USING DISTRIBUTED AUTONOMOUS AGENTS

CROSS-REFERENCE TO RELATED APPLICATIONS

This application is related to and claims priority from U.S. Provisional Patent Application No. 60/200,507 entitled "AUTONOMOUS AGENT ARCHITECTURE," filed Apr. 28, 2000, and U.S. Provisional Patent Application No. 60/222,729 entitled "LARGE-SCALE NETWORK MODELING USING DISTRIBUTED AUTONOMOUS NETWORK ELEMENTS AGENTS," filed Aug. 3, 2000, both incorporated herein by reference in their entirety.

FIELD OF THE INVENTION

The present invention relates to computer network management in general, and more particularly to a large-scale public and private network management architecture using distributed autonomous agents.

BACKGROUND OF THE INVENTION

Classic large-scale computer network architectures having hundreds or thousands of network elements, such as bridges, routers, and switches, are typically managed by a single, centralized network management server, which, by itself or possibly with the help of distributed data acquisition units, gathers information received from the network elements, through techniques such as polling or event trapping, in support of performing centralized functions such as determining the topology or operational status of the entire network. Such centralized, hierarchical systems in which raw or formatted information is processed at a master server ultimately suffer from exhaustion of computation resources and poor response times. A necessary requirement of such centralized network management architectures is that the network management server "see" the entire network and thus be able to receive information from or regarding every element on the network and manage every such element as necessary. Other network management solutions that partition a network into multiple domains, with each domain being separately managed by a central server, do not offer a clear way of integrating cross-domain and end-to-end information, and are therefore not viewed as a full solution, or transform into a multi-hierarchy centralized bottleneck.

Centralized network management systems suffer particularly when dealing with network surveillance and provisioning. In the event of a network fault, such as if a link between network elements falls, the fault would typically be detected by a polling unit which would then report the fault to the network management server which would determine root cause, effect, and a course of action. As the number of faults increases, the increasing complexity and load of the required computation would eventually result in a failure of the central server and in faults not being handled. End-to-end provisioning and configuration requests that are carried out centrally would likewise suffer from increased multi-element multi-layer computation load and complexity. This problem is compounded in partitioned systems where part of the network suffers, as each centralized server does not see the entire network, which may be critical in handling cross-partition faults or provisioning.

Hence, computer network architectures that employ centralized network management are not easily scalable. Thus, as the number and complexity of network elements increases, and as provisioning procedures grow increasingly complex as the network diversifies, the central network management server will ultimately fail as its capacity to receive and process information from all network elements is exceeded.

SUMMARY OF THE INVENTION

The present invention seeks to provide a large-scale network management architecture using distributed autonomous agents that allow network components to be easily added and monitored without burdening a central network management server. Instead of a single, centralized network management server, the present invention provides for a plurality of decentralized network management units, where each network management unit sees and is responsible for only a portion of the overall network. A software and/or hardware "agent" is defined for each network element, with each decentralized network management unit hosting those agents that correspond to the portion of the network for which the network management unit is responsible. Each agent in turn comprises a plurality of device components (DCs), with each DC modeling one or more physical and/or logical aspects of the network element, typically with each DC bound and scoped to cover functionality which is within a single network layer. Moreover, the set of DCs comprising the agent, form published, well-defined, and addressable interfaces of each agent, which may then be easily made known and addressable to other agents.

There is thus provided in accordance with a preferred embodiment of the present invention in a computer network including a plurality of network elements, a network management architecture including a plurality of agents, each of the agents corresponding to a different one of the network elements, and a plurality of device components, each of the device components modeling at least one aspect of one of the network elements, the aspect being either of a physical and a functional characteristic of the network element, where each of the agents includes a plurality of the device components, and where at least of the two device components within at least one of the agents are logically interconnected, each logical interconnection corresponding to either of a physical and a functional interconnection found within or between any of the network elements.

Further in accordance with a preferred embodiment of the present invention the architecture further includes at least one decentralized network management unit operative to host any of the agents.

Still further in accordance with a preferred embodiment of the present invention any of the network elements hosts any corresponding one of the agents.

Additionally in accordance with a preferred embodiment of the present invention any of the device components models a plurality of the aspects at a single layer of the network.

Moreover in accordance with a preferred embodiment of the present invention the device components within any of the agents are logically interconnected in a hierarchy.

Further in accordance with a preferred embodiment of the present invention at least one of the device components within any one of the agents is logically interconnected with at least one other of the device components within any other of the agents.

Still further in accordance with a preferred embodiment of the present invention any of the device components is operative to receive information from a corresponding one of the network elements, where the information relates to any of the aspects modeled by the device component.

Additionally in accordance with a preferred embodiment of the present invention the device component is operative to receive the information by polling the corresponding network element.

Moreover in accordance with a preferred embodiment of the present invention the device component is operative to receive the information upon an event trap being triggered at the corresponding network element.

Further in accordance with a preferred embodiment of the present invention any one of the device components is operative to send a message to any other of the device components to which the one device component is logically interconnected.

Still further in accordance with a preferred embodiment of the present invention any one of the device components is operative to send a message to at least one external entity which is other than the device components and the agents.

Additionally in accordance with a preferred embodiment of the present invention the device components are operative to monitor the state of the network at multiple network layers using discrete message passing between the device components in support of providing end-to-end network information and enforcing consistent policies and configurations.

Moreover in accordance with a preferred embodiment of the present invention the device components are operative to identify network faults within the network at multiple network layers using discrete message passing between the device components in support of end-to-end and root cause fault analysis.

Further in accordance with a preferred embodiment of the present invention the device components are operative to configure the network at multiple network layers using discrete message passing between the device components in support of end-to-end service provisioning.

There is also provided in accordance with a preferred embodiment of the present invention in a computer network including a plurality of network elements, a network management method including defining a plurality of agents, each of the agents corresponding to a different one of the network elements, and defining a plurality of device components, each of the device components modeling at least one aspect of one of the network elements, the aspect being either of a physical and a functional characteristic of the network element, defining each of the agents as having a plurality of the device components, and logically interconnecting at least of the two device components within at least one of the agents, each logical interconnection corresponding to either of a physical and a functional interconnection found within or between any of the network elements.

Further in accordance with a preferred embodiment of the present invention the method further includes hosting any of the agents in at least one decentralized network management unit.

Still further in accordance with a preferred embodiment of the present invention the method further includes hosting any of the agents in any of the network elements.

Additionally in accordance with a preferred embodiment of the present invention the method further includes any of the device components modeling a plurality of the aspects at a single layer of the network.

Moreover in accordance with a preferred embodiment of the present invention the logically interconnecting step includes logically interconnecting any of the device components within any of the agents in a hierarchy.

Further in accordance with a preferred embodiment of the present invention the logically interconnecting step includes logically interconnecting at least one of the device components within any one of the agents with at least one other of the device components within any other of the agents.

Still further in accordance with a preferred embodiment of the present invention the method further includes any of the device components receiving information from a corresponding one of the network elements, where the information relates to any of the aspects modeled by the device component.

Additionally in accordance with a preferred embodiment of the present invention the receiving step includes the device component receiving the information by polling the corresponding network element.

Moreover in accordance with a preferred embodiment of the present invention the receiving step includes the device component receiving the information upon an event trap being triggered at the corresponding network element.

Further in accordance with a preferred embodiment of the present invention the method further includes any one of the device components sending a message to any other of the device components to which the one device component is logically interconnected.

Still further in accordance with a preferred embodiment of the present invention the method further includes any one of the device components sending message to at least one external entity which is other than the device components and the agents.

Additionally in accordance with a preferred embodiment of the present invention the method further includes any one of the device components monitoring the state of the network at multiple network layers discrete message passing between the device components in support of providing end-to-end network information and enforcing consistent policies and configurations.

Moreover in accordance with a preferred embodiment of the present invention the method further includes any one of the device components identifying network faults within the network at multiple network layers using discrete message passing between the device components in support of end-to-end and root cause fault analysis.

Further in accordance with a preferred embodiment of the present invention the method further includes any one of the device components configuring the network at multiple network layers using discrete message passing between the device components in support of end-to-end service provisioning.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
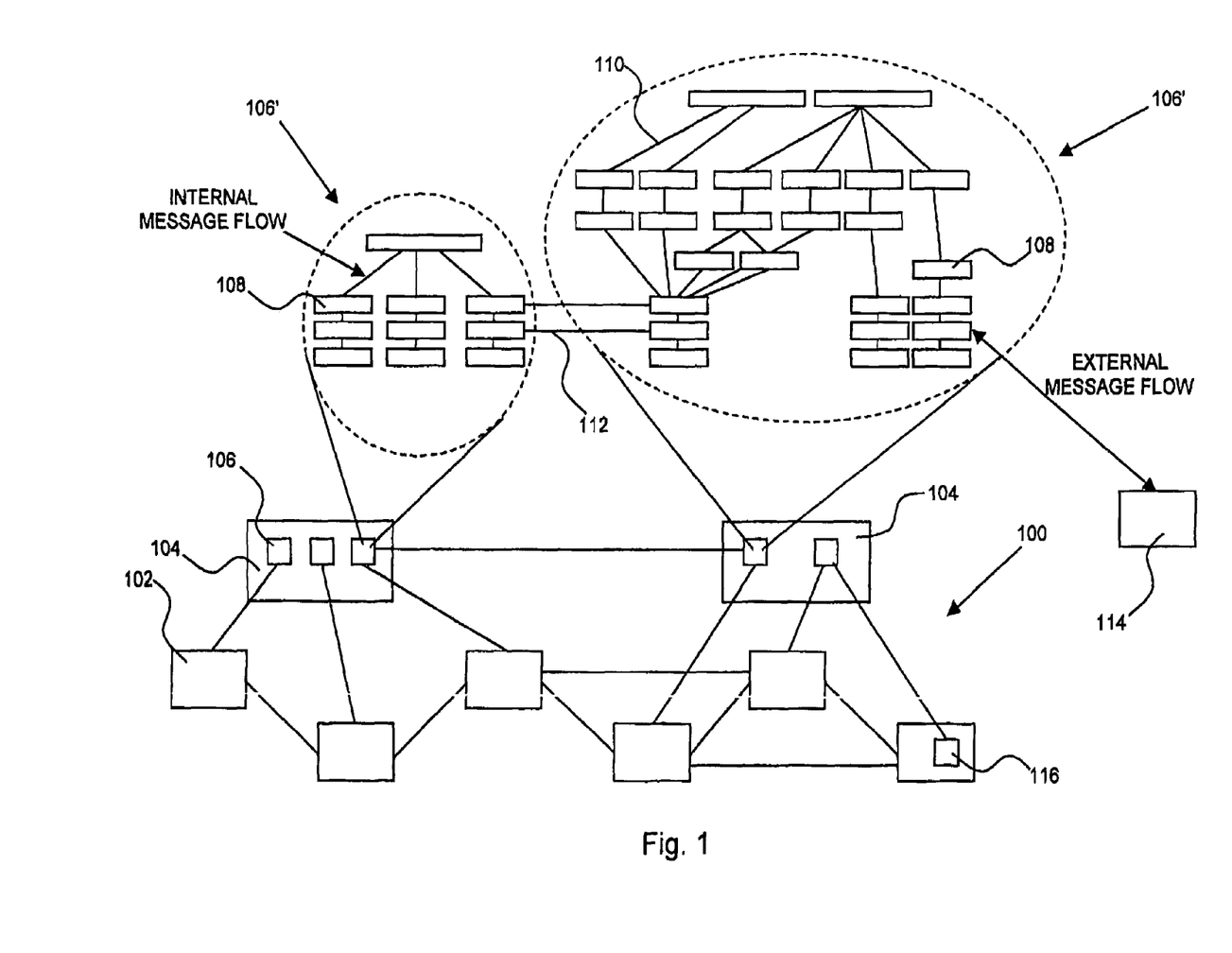
FIG. 1 is a simplified conceptual illustration of a large-scale network management system using distributed autonomous agents, constructed and operative in accordance with a preferred embodiment of the present invention.

Reference is now made to FIG. 1 which is a simplified conceptual illustration of a large-scale network management system using distributed autonomous agents, constructed and operative in accordance with a preferred embodiment of the present invention. In the system of FIG. 1 a network, generally designated 100, comprises a plurality of network elements 102, and is managed by one or more decentralized network management units 104, where each network management unit 104 sees and is responsible for only a portion of the overall network 100. A proxy or hardware embedded "agent" 106 is defined for each network element 102, with each decentralized network management unit 104 hosting those agents 106 that correspond to the portion of the network 100 for which the network management unit 104 is responsible. (Various agents 106 are shown in expanded views in dashed lines indicated by reference numerals 106'.)

Each agent 106 in turn comprises a plurality of device components (DCs) 108, with each DC 108 modeling one or more physical and/or logical aspects of the device 102, typically within a single network layer. For example, a DC 108 may represent an Ethernet port component, a 1483 encapsulation component, or routing functionality within a network element incorporating such functionality. DCs 108 may maintain any information concerning certain functions or aspects of the specific network element. This information may be static, dynamic, or any combination thereof. DCs 108 may communicate directly with other DCs 108, and two DCs 108 that communicate with each other are referred to as "neighbors." DCs 108 are typically arranged in a functional hierarchy within the agent 106, with a higher-level DC acting as the "parent" to one or more lower-level DC "children" with which it communicates, such as is shown at reference numeral 110. DCs that communicate with other DCs that are of the same type or perform the same function are referred to as "acquaintances," such as is shown at reference number 112. DCs may become "acquainted" by manually defining relationships between DCs or by having DCs send messages in order to discover topologically adjacent DCs. A DC 108 may be acquainted with another DC 108 within the same agent 106 or within another agent 106. Each DC 108 preferably uses message passing to independently communicate with any neighbor or adjacent DCs without the need to communicate directly with a centralized network management device.

DCs 108 may send/receive messages to/from neighbor DCs 108, to the network element 102 which the DC 108 models, or an external entity or device 114 (either logical or physical) that is not modeled by an agent or a DC. Information flows between DCs 108 are referred to as "internal" flows, while information flows between DCs 108 and external entities or devices 114 are referred to as "external flows". One example of an internal flow is where a device component detects a fault within its area of responsibility and reports the fault to neighboring DCs to whom such information is useful. One example of an external flow is as the result of a query of all DCs 108 in network 100 by logic external to the DCs 108 and/or the agents 106 for gathering the IP addresses of devices 102 where available. Upon receiving a message, a DC may ignore the message or may react by autonomously changing its physical or logical state and/or that of its corresponding area of functionality within the network device or send a message to itself or to a neighbor DC.

Additionally or alternatively to agents 106 being hosted by decentralized network management units 104, each network element 102 may itself host its agent and/or another device's autonomous agent, such as is shown at reference numeral 116. Thus, were each network element 102 to host its own agent, no decentralized network management units 104 would be required.

Figure 2:
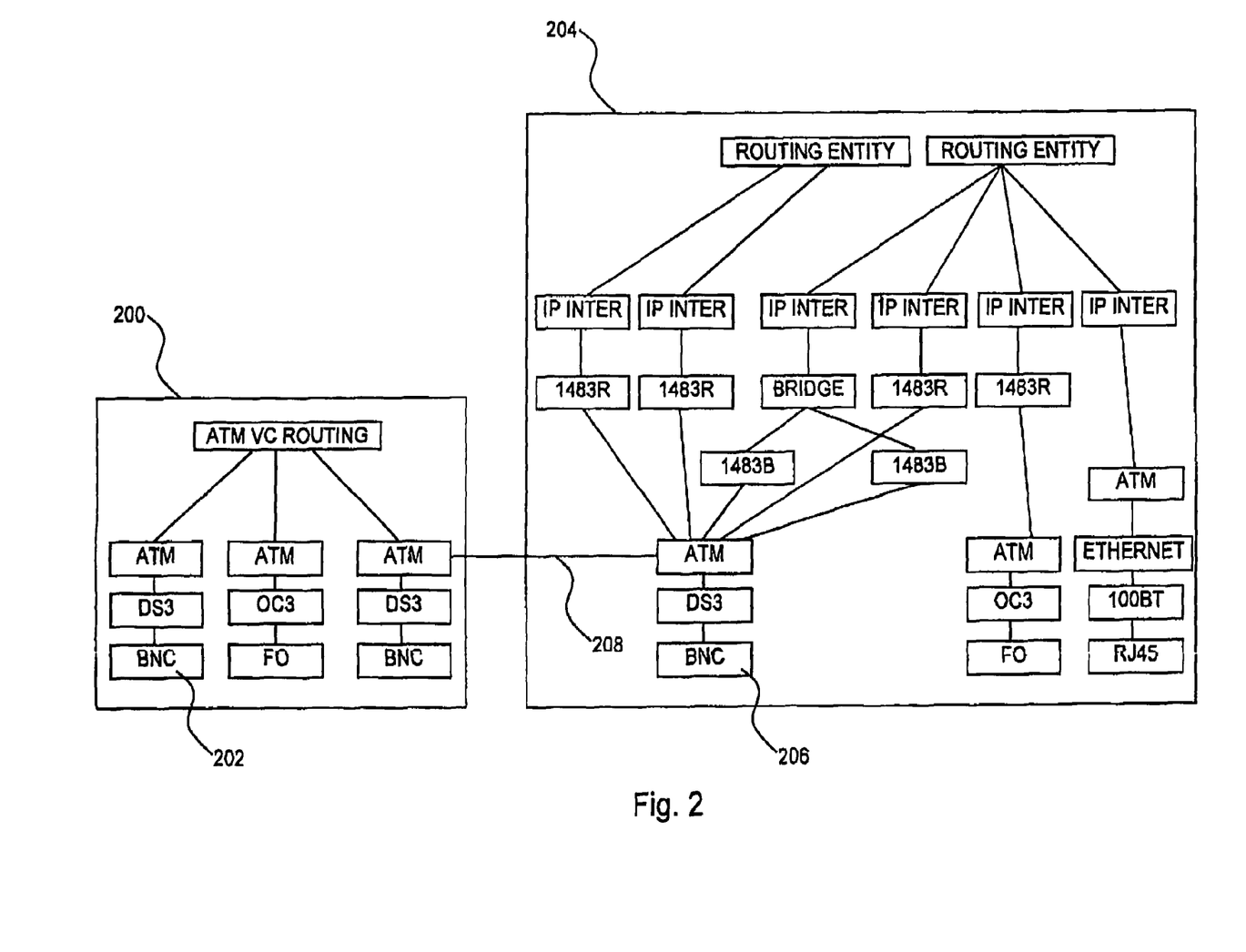
FIG. 2 is a simplified conceptual illustration of an exemplary agent and DC configuration, constructed and operative in accordance with a preferred embodiment of the present invention.

Reference is now made to FIG. 2 which is a simplified conceptual illustration of an exemplary agent and DC configuration, constructed and operative in accordance with a preferred embodiment of the present invention. In FIG. 2 an ATM switch having three ATM ports is modeled by an agent 200. Agent 200 in turn includes several DCs 202 as follows: two DCs corresponding to two BNC connectors, one DC corresponding to a fiber optic (FO) connector, two DC parents to the BNC DCs representing DS3 connectivity, one DC parent to the FO connector representing OC3 connectivity, three DCs representing the ATM network layer functionality for each of the three ATM ports, and a DC parent corresponding to the switch's ATM virtual channel (VC) routing functions. Also shown is an agent 204 having multiple DCs 206 corresponding to ATM and Ethernet connections and functionality at various network layers representing bridging, switching, and routing functions, including IP and 1483 interface protocols.

An ATM DC in FIG. 2 may, for example, maintain a list of all the VCs assigned to the ATM port it models, and may monitor the removal of a VC from the port or the allocation of a new VC to the port. An IP interface DC may, for example, contain the IP address of the physical IP interface of the device and subnet mask. Each type of DC may appear in several instances in one or more agents depending on the specific device and its configuration. Thus, in FIG. 2, since the network device represented by agent 200 has three ATM ports, agent 200 has three instances of an ATM-type DC.

The configuration of FIG. 2 may be adapted through continuous modeling to reflect the true state of the network at any given time. DCs and the links between them may be added or removed at runtime to reflect the current stage of the network, allowing tracing of the data flows, states and reactions of the network. Changes in the underlying physical network may be dynamically reflected by the model by affecting the DCs and the connections between them in response to network events. For example, if a link is disconnected between two ATM ports in the network, a link 208 between the neighbor ATM DCs in agents 200 and 202 representing network layer 2 adjacency should be removed. When the link is reconnected, link 208 between the two ATM DCs may be restored.

By modeling the network elements in a computer network using interconnected agents through the DCs in them as shown in FIGS. 1 and 2, the network may be fully modeled at both the network element and network function levels. Furthermore, the model may be used to reflect at any given moment the current state of the network, with DCs autonomously supporting fault, configuration, accounting, performance, security, policy, and provisioning functions.

Figure 3:
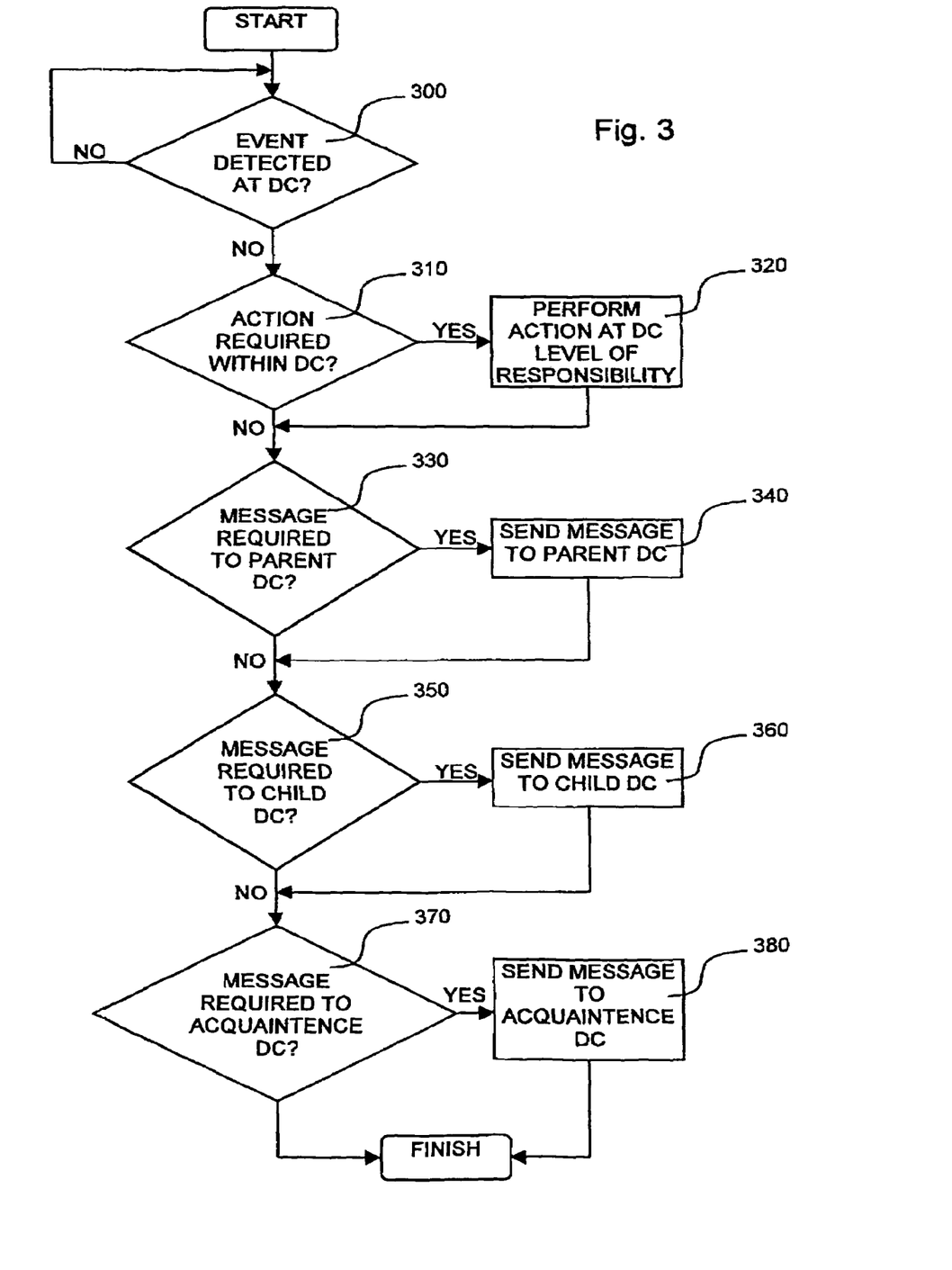
FIG. 3 is a simplified flowchart illustration of an exemplary decision-routing DC framework, operative in accordance with a preferred embodiment of the present invention.

Reference is now made to FIG. 3, which is a simplified flowchart illustration of an exemplary decision-routing DC framework, operative in accordance with a preferred embodiment of the present invention. In the method of FIG. 3 an event, such as a fault or a provisioning request, is detected at a DC (step 300). The DC then determines if it is to take any action in response to the event within the DC and/or its area of responsibility (step 310), and, if so, performs such action (step 320). The DC then determines if it is to send any messages to a parent DC (step 330), a child DC (step 350), and/or an acquaintance DC (step 370), and sends any required messages (steps 340, 360, and 380).

The concept of events and flows as described hereinabove with reference to FIGS. 1, 2, and 3, may be better understood by way of example. In what is referred to as a system-wide, top-down flow, a request arrives from an external entity and is spread from DC to DC, with each DC performing its independent computations which collectively achieve the external request. For example, the provisioning of a QoS parameter for a specific user class is signaled and synchronized for IP ToS masks between IP DCs of routers and is also carried by the routers' IP-over-ATM-interface DCs into the ATM DCs which signal and synchronize the ATM VBR parameters to the DCs of the ATM switches between the routers. In other words, for configuration of QoS between two IPs, the routers on the path between the two IPs may be configured with consistent ToS parameters. Moreover, the ATM path between every two consecutive routers in the layer 3 path may be configured with consistent VBR parameters. In a bottom-up flow, a network or DC event, including scheduled events, may propagate to other DCs which change their state and/or perform their part in a distributed algorithm. An example of such a flow is in fault detection. For example, an ATM circuit break is signaled by ATM DCs to both ends of the circuit. The signal is then propagated up the stack to IP DCs in routers whose IP-over-ATM-interface is affected by the break. The unreachable IP subnet failure is then correlated with the ATM circuit break point which initiated the flow.

An example of DC discrete message passing that provides multi-layer control signaling for use in end-to-end provisioning and fault isolation may be understood with reference to acquainted same-layer, same-technology DCs (e.g., two layer 2 ATM DCs, two layer 3 IP MPLS DCs, two Layer 5 H323 DCs, etc.) in neighboring agents representing different network elements as defined by that layer's standards. The two DCs may exchange discrete messages regarding configuration parameters, status monitoring, statistics, and accounting parameters of the layer interface as it is implemented in the two elements. Similarly, father-son DCs representing areas of responsibility in the same network element which maps functionality between upper and lower layers or functions as defined in networking standards and in the specific network element specifications (e.g., IP to Ethernet, ATM to DS3, SONET to DWDM, etc.) may exchange discrete messages regarding the way in which configuration parameters of the upper layer relate to the lower layer and visa versa (e.g., MTU, IP TOS to dot.p, etc.), regarding the way in which faults have an effect between layers (e.g., layer 2 link down, layer 3 unreachable subnet, etc.), and the way performance statistics affect the layers involved in such mapping.

It is appreciated that events and messaging of the present invention preferably adhere to networking standards. Thus, for example, two DCs on both sides of an interoperable logical link may signal each other the existence of a link failure (e.g., far-end near-end SONET) or agree on a constant configuration parameter (e.g., SONET/SDH VP/VC Mask, etc.). Similarly, parameters of an upper layer may be mapped to a lower layer in according with networking standards as deployed in the network elements, such as the way an IP switch chip is wired to an Ethernet MAC chip or the way IP software drives SONET hardware. The combination of such parent-child and acquaintance-acquaintance single-hop discrete message passing between DCs constitutes a powerful multi-layer signaling mechanism that can carry out end-to-end provisioning tasks and can deduce the root cause and the effect of a network condition.

It is appreciated that one or more of the steps of any of the methods described herein may be omitted or carried out in a different order than that shown, without departing from the true spirit and scope of the invention.

While the present invention as disclosed herein may or may not have been described with reference to specific hardware or software, the present invention has been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. In a computer network comprising a plurality of network elements, a network management architecture comprising:
  a plurality of agents, each of said agents corresponding to a different one of said network elements; and
  a plurality of device components, each of said device components modeling at least one aspect of one of said network elements, said aspect being either of a physical and a functional characteristic of said network element,
  wherein each of said agents comprises a plurality of said device components,
  wherein a first agent comprises a first device component that is associated with a first OSI Reference Model network protocol layer and a second device component that is associated with a second OSI Reference Model network protocol layer that is different from the first OSI Reference Model network protocol layer, and wherein a second agent comprises a third device component that is associated with the first OSI Reference Model network protocol layer;
  wherein at least two of said device components within at least one of said agents are logically interconnected, each logical interconnection corresponding to either of a physical and a functional interconnection found within or between any of said network elements,
  wherein any of said device components is operative to send a message regarding an event within its area of responsibility to any other of said device components neighboring said device component, whereupon any of said message-receiving device components is operative, responsive to said message receipt, to autonomously change a state of its corresponding area of functionality within its associated network element,
  wherein the first device component is operative to send to the second device component a second message that maps any of configuration parameters, status monitoring, statistics, or accounting parameters of the first OSI Reference Model network protocol layer to different parameters of the second OSI Reference model network protocol layer.

2. An architecture according to claim 1 and further comprising at least one decentralized network management unit operative to host any of said agents.

3. An architecture according to claim 1 wherein any of said network elements hosts any corresponding one of said agents.

4. An architecture according to claim 1 wherein any of said device components models a plurality of said aspects at a single layer of said network.

5. An architecture according to claim 1 wherein said device components within any of said agents are logically interconnected in a hierarchy.

6. An architecture according to claim 1 wherein at least one of said device components within any one of said agents is logically interconnected with at least one other of said device components within any other of said agents.

7. An architecture according to claim 1 wherein any of said device components is operative to receive information from a corresponding one of said network elements, wherein said information relates to any of said aspects modeled by said device component.

8. An architecture according to claim 7 wherein said device component is operative to receive said information by polling said corresponding network element.

9. An architecture according to claim 7 wherein said device component is operative to receive said information upon an event trap being triggered at said corresponding network element.

10. An architecture according to claim 1 wherein any one of said device components is operative to send a message to at least one external entity which is other than said device components and said agents.

11. An architecture according to claim 1 wherein said device components are operative to monitor a state of said network at multiple network layers using discrete message passing between said device components in support of providing end-to-end network information and enforcing consistent policies and configurations.

12. An architecture according to claim 1 wherein said device components are operative to identify network faults within said network at multiple network layers using discrete message passing between said device components in support of end-to-end and root cause fault analysis.

13. An architecture according to claim 1 wherein said device components are operative to configure said network at multiple network layers using discrete message passing between said device components in support of end-to-end service provisioning.

14. In a computer network comprising a plurality of network elements, a network management method comprising:

defining a plurality of agents, each of said agents corresponding to a different one of said network elements; and defining a plurality of device components, each of said device components modeling at least one aspect of one of said network elements, said aspect being either of a physical and a functional characteristic of said network element, defining each of said agents as having a plurality of said device components, wherein a first agent comprises a first device component that is associated with a first OSI Reference Model network protocol layer and a second device component that is associated with a second OSI Reference Model network protocol layer that is different from the first OSI Reference Model network protocol layer, and wherein a second agent comprises a third device component that is associated with the first OSI Reference Model network protocol layer;

logically interconnecting at least two of said device components within at least one of said agents, each logical interconnection corresponding to either of a physical and a functional interconnection found within or between any of said network elements;

configuring any of said device components to send a message regarding an event within its area of responsibility to any other of said device components neighboring said device component; and configuring any of said device components to autonomously change a state of its corresponding area of functionality within its associated network element responsive to said message receipt;

configuring the first device component to send to the second device component a second message that maps any of configuration parameters, status monitoring, statistics, or accounting parameters of the first OSI Reference Model network protocol layer to different parameters of the second OSI Reference model network protocol layer.

15. A method according to claim 14 and further comprising hosting any of said agents in at least one decentralized network management unit.

16. A method according to claim 14 and further comprising hosting any of said agents in any of said network elements.

17. A method according to claim 14 and further comprising any of said device components modeling a plurality of said aspects at a single layer of said network.

18. A method according to claim 14 wherein said logically interconnecting step comprises logically interconnecting any of said device components within any of said agents in a hierarchy.

19. A method according to claim 14 wherein said logically interconnecting step comprises logically interconnecting at least one of said device components within any one of said agents with at least one other of said device components within any other of said agents.

20. A method according to claim 14 and further comprising any of said device components receiving information from a corresponding one of said network elements, wherein said information relates to any of said aspects modeled by said device component.

21. A method according to claim 20 wherein said receiving step comprises said device component receiving said information by polling said corresponding network element.

22. A method according to claim 20 wherein said receiving step comprises said device component receiving said information upon an event trap being triggered at said corresponding network element.

23. A method according to claim 14 and further comprising any one of said device components sending message to at least one external entity which is other than said device components and said agents.

24. A method according to claim 14 and further comprising any one of said device components monitoring a state of said network at multiple network layers using discrete message passing between said device components in support of providing end-to-end network information and enforcing consistent policies and configurations.

25. A method according to claim 14 and further comprising any one of said device components identifying network faults within said network at multiple network layers using discrete message passing between said device components in support of end-to-end and root cause fault analysis.

26. A method according to claim 14 and further comprising any one of said device components configuring said network at multiple network layers using discrete message passing between said device components in support of end-to-end service provisioning.

27. An architecture according to claim 1, wherein the first device component is operative to send to the third device component a third message comprising any of configuration parameters, status monitoring, statistics, or accounting parameters of the first OSI Reference Model network protocol layer.

28. A data processing apparatus comprising:
- a plurality of agents, each of said agents corresponding to a different one of a plurality of network elements; and
- a plurality of device components, each of said device components modeling at least one aspect of one of the network elements, wherein the aspect is either of a physical and a functional characteristic of the one of the network elements,
- wherein each of the agents comprises a plurality of the device components,
- wherein a first agent comprises a first device component that is associated with a first OSI Reference Model network protocol layer and a second device component that is associated with a second OSI Reference Model network protocol layer that is different from the first layer, and wherein a second agent comprises a third device component that is associated with the first OSI Reference Model network protocol layer;
- wherein at least two of said device components within at least one of the agents are logically interconnected by a logical interconnection corresponding to either of a physical and a functional interconnection found within or between any of the network elements,
- wherein each of the device components comprises logic which when executed is operable to send a first message regarding an event within an area of responsibility to any other of the device components, and in response to receiving the message to autonomously change a state of its corresponding area of functionality within its associated network element,
- wherein the first device component is comprises logic which when executed is operable to send to the second device component a second message that maps any of configuration parameters, status monitoring, statistics, or accounting parameters of the first OSI Reference Model network protocol layer to different parameters of the second OSI Reference model network protocol layer.

29. The apparatus of claim 28, wherein the first device component further comprises logic which when executed is operable to send to the third device component a third message comprising any of configuration parameters, status monitoring, statistics, or accounting parameters of the first OSI Reference Model network protocol layer.

* * * * *